United States Patent Office 3,519,518
Patented July 7, 1970

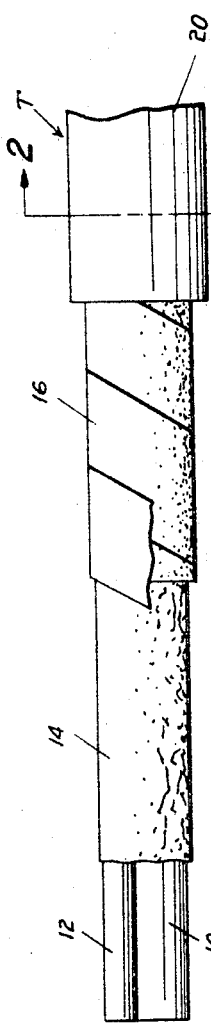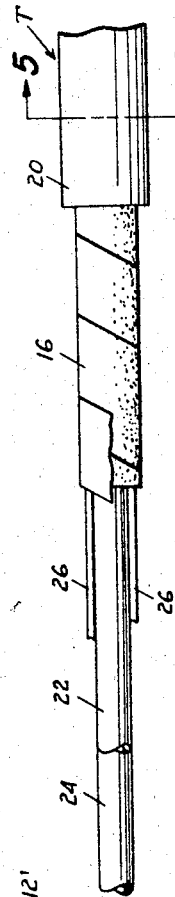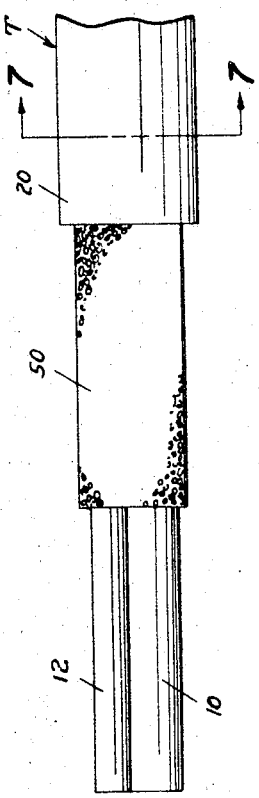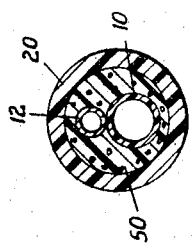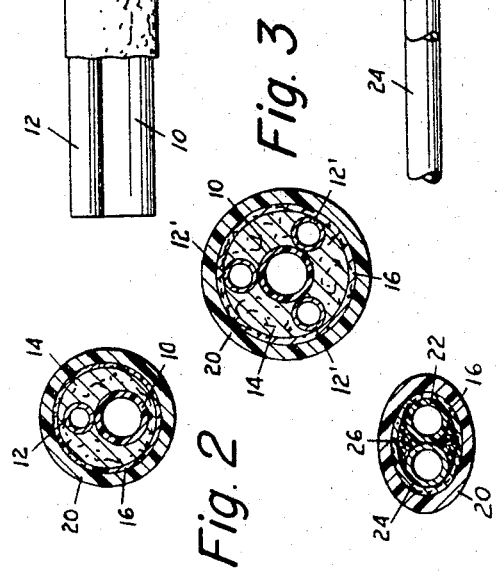
INVENTORS
RICHARD A. MATTHEWS
BY HANS A. JOHANSEN
ATTORNEYS July 7, 1970 R. A. MATTHEWS ET AL 3,519,518
COMPOSITE TUBING PRODUCT AND APPARATUS FOR
MANUFACTURING THE SAME
Original Filed July 7, 1966 3 Sheets-Sheet 2
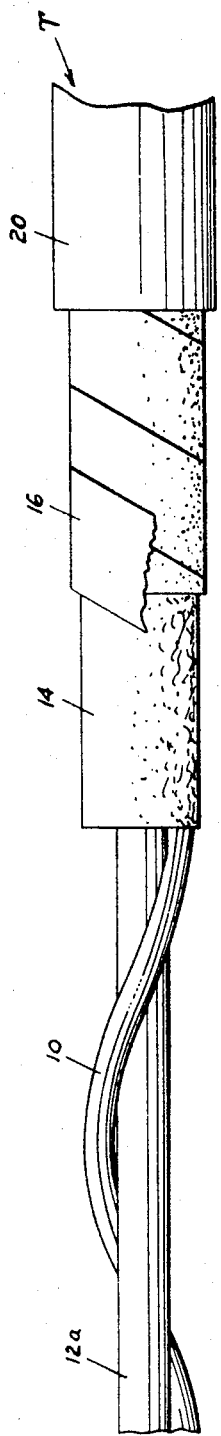
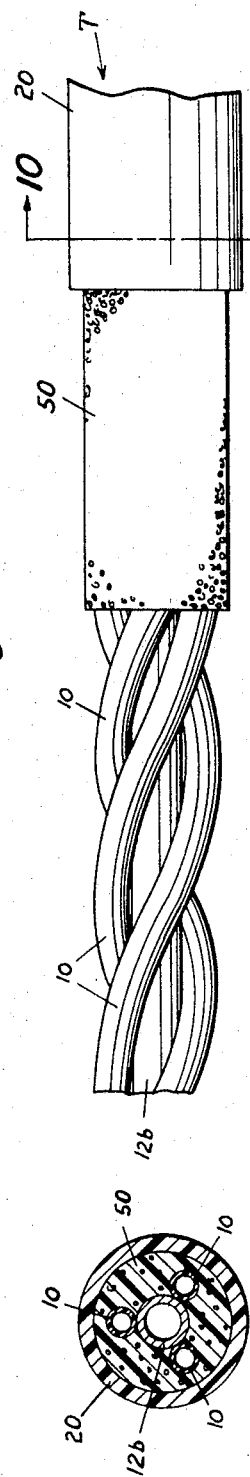
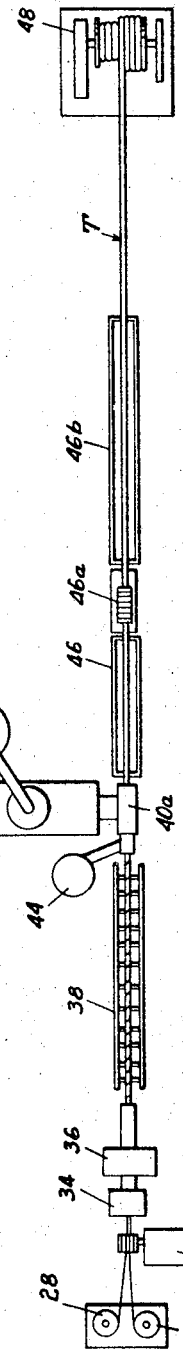
INVENTORS
RICHARD A. MATTHEWS
BY HANS A. JOHANSEN
ATTORNEYS

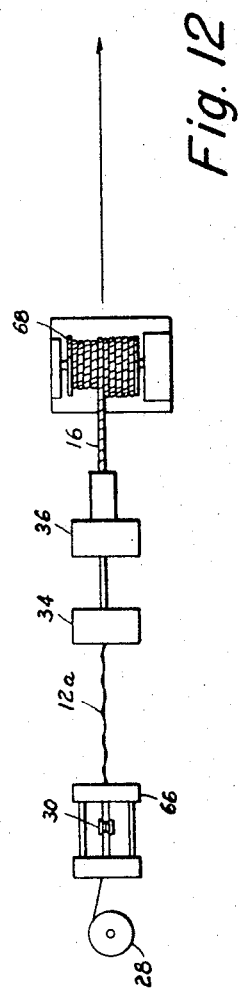
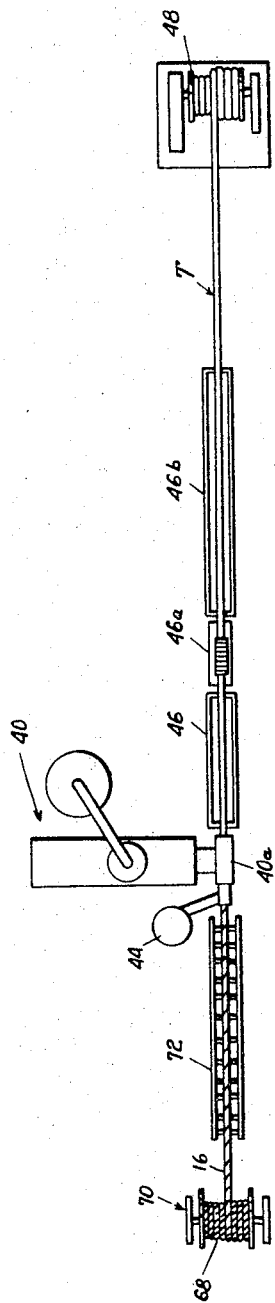
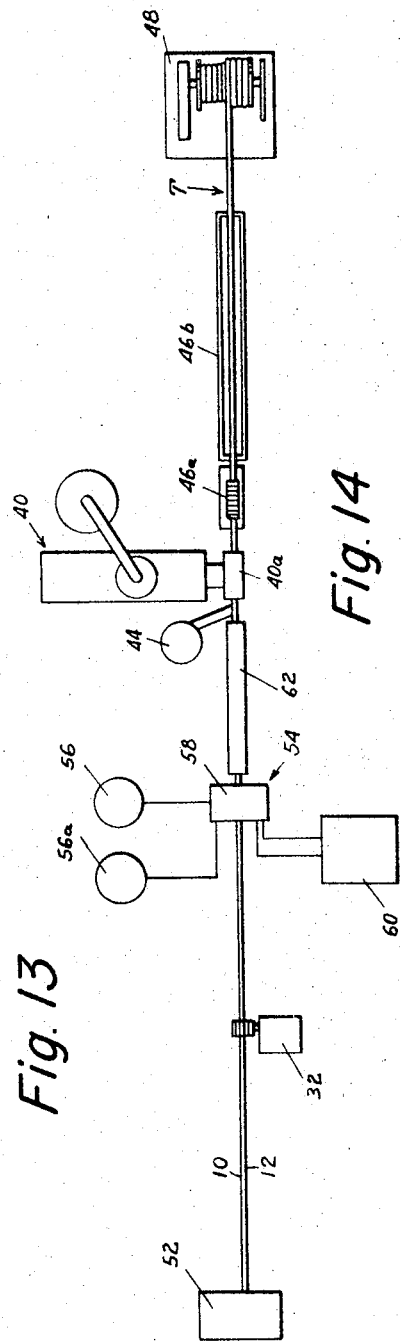

3,519,518
COMPOSITE TUBING PRODUCT AND APPARATUS FOR MANUFACTURING THE SAME
Richard A. Matthews, Chagrin Falls, and Hans A. Johansen, Mantua, Ohio, assignors to Samuel Moore and Company, Mantua, Ohio, a corporation of Ohio
Application July 7, 1966, Ser. No. 563,512, now Patent No. 3,400,737, dated Sept. 10, 1968, which is a continuation-in-part of application Ser. No. 250,390, Jan. 9, 1963, now Patent No. 3,269,422. Divided and this application May 9, 1968, Ser. No. 728,000
Int. Cl. B65h 81/00
U.S. Cl. 156—392       10 Claims

ABSTRACT OF THE DISCLOSURE

An apparatus system and method for continuously producing a deformable, composite tubing product including a pay-off device for a sampling line and pay-off device for a heating line with a conveyance system for moving the lines in engaged heat transfer relation along their length. An applicator mechanism is disposed for applying a flexible, thermo-barrier layer around the lines and an extruding mechanism is disposed for applying an outer flexible polymeric sheath around the thermo-barrier layer.

---

This is a division of the copending application to Richard A. Matthews and Hans A. Johansen, Ser. No. 563,512, filed July 7, 1966, now Patent No. 3,400,737 which is a continuation-in-part of application Ser. No. 250,390, filed Jan. 9, 1963, now Pat. No. 3,269,422 to Richard A. Matthews and Hans A. Johansen.

BACKGROUND OF THE INVENTION

This type of a tubing finds its principal use in the chemical processing and petroleum refining industries, and is used, for example, for conveying a sample of fluid from a process line, or a reaction vessel, to an automatic instrument, such as a continuous sampling instrument— for example a chromatograph or infrared spectograph. Samples of the fluid taken under these conditions generally must be maintained at a relatively elevated temperature, because the viscosity of the fluid must be kept as low as possible, and moreover in case of a gas sample being transmitted, the gaseous sample must not be permitted to condense.

At the present time these sampling lines are oftentimes made up at the site, by supporting a steam carrying copper pipe from a point of sampling, to the instrumentation that is adapted to receive the sample, and then utilizing a sample tube of stainless steel for transmitting the sample, and bending the stainless steel tube in appropriate places for clamping to the supporting heating tube. The overall structure is then generally coated with a cement such as for instance "Thermon" and may be wrapped with insulation, such as cork or the magnesia-type, for maintaining the temperature of the sampling tube. Oftentimes, the entire structure is then wrapped with a metal tape, or covered with pitch, in order to protect it from weather conditions.

This type of structure, is extremely expensive and difficult to lay out, and moreover in the event of any difficulties with the sampling structure, it is almost impossible to repair, and therefore is generally completely torn out, and completely replaced in the event of any such trouble. Also because of the custom made construction, the heat conductivity from one end of the sampling structure to the other may not be uniform, and often results in cold spots. Accordingly, such custom made sampling structure has not been completely satisfactory, so far as industry is concerned.

In the aforementioned application Ser. No. 250,390 there is disclosed a composite tubing product that is more satisfactory as compared to such heretofore known arrangements and which generally comprises a metallic heating line and a metallic sampling line disposed in engaged relation, and about which is disposed an insulating layer covered with a sheath of flexible polymeric material. In such tubing product the sampling line is comprised of a metallic material, such as for instance stainless steel. It has been found, however, that metallic materials, such as stainless steel, are not entirely satisfactory in certain sampling line applications, such as in sampling flue gases, where the sampling material contains a large amount of chlorides and/or other corrosive materials damaging to stainless steel. Though other corrosion resistant metal alloys may be available for such purposes, their significantly increased cost renders use thereof impractical in many applications.

Another important difficulty with the all metal construction (i.e., heating line and sampling line) resides in the heat moderating and distributing characteristic between the heating line and the sampling line. Such arrangements result in a substantial reduction in modular control of heat transfer with consequent formation of random hot spots along the length of the sampling line when handling heat sensitive materials, particularly at elevated temperatures.

A further difficulty with such all metal constructions is that they are not completely satisfactory in certain applications in producing optimum bundle flexibility, particularly when a plurality of sampling lines are employed. In addition, it has been found, as a practical matter, that certain forms of metal alloys, such as of stainless steel and/or other exotic metal alloys, which may be employed for sampling line purposes are available only in relatively limited lengths and/or in certain sizes which renders their use unsatisfactory in many applications.

SUMMARY OF THE INVENTION

The present invention, therefore, constitutes an improvement over that which is embodied in the aforementioned application Ser. No. 250,390 and contemplates the provision of an apparatus system and method for producing a composite tubing product which comprises one or more metallic heating lines and one or more polymeric sampling lines disposed in engaged heat transfer relation with one another about which may be disposed a heat insulating and/or conductive media, and all of which may be covered with a sheath of polymeric material to provide a unitary sampling structure.

Accordingly, an object of the present invention is to provide an improved construction for an apparatus system and method for producing a composite tubing product adapted for use in conveying fluids, such as for sampling purposes, which provides a more uniform, modular control of heat transfer between the heating line and the sampling line; which incorporates one or more flexible, polymeric sampling lines having improved corrosion resistance; which provides an improved bundle flexibility, particularly when a plurality of sampling lines are employed; which is quick and easy to install at the work site; which is of a uniform construction throughout its length for producing consistent and accurate sampling results; and which can be efficiently mass produced with minimum expense.

Other objects and advantages of the invention will be apparent from the following description taken in conjunction with the accompanying drawings, wherein:

FIG. 1 is a partially cut away elevational view of a composite tubing product produced in accordance with the instant invention;

FIG. 2 is a transverse cross-sectional view taken generally along the plane of line 2—2 of FIG. 1 looking in the direction of the arrows;

FIG. 3 is a sectional view generally similar to that of FIG. 2, but illustrating a modification of the FIGS. 1 and 2 arrangement;

FIG. 4 is a partially cut away elevational view of a modified form of composite tubing product as compared to that of FIGS. 1, 2 and 3;

FIG. 5 is a transverse sectional view taken generally along the plane of line 5—5 of FIG. 4, looking in the direction of the arrows;

FIG. 6 is a partially cut away elevational view illustrating another embodiment of composite tubing product;

FIG. 7 is a transverse sectional view taken generally along the plane of line 7—7 of FIG. 6, looking in the direction of the arrows;

FIG. 8 is a partially cutaway elevational view of another embodiment of the composite tubing product of the invention;

FIG. 9 is a partially cutaway elevational view of a further modification of composite tubing product made in accordance with the invention;

FIG. 10 is a transverse sectional view taken generally along the plane of line 10—10 of FIG. 9, looking in the direction of the arrows;

FIG. 11 is a more or less diagrammatic, top plan view of apparatus disposed in an organized system, for producing the composite tubing products illustrated for instance in FIGS. 1 to 5 inclusive;

FIGS. 12 and 13 are top plan generally diagrammatic views of apparatus disposed in an organized system for producing the embodiment of the composite tubing illustrated for instance in FIG. 8; and FIG. 14 is a top plan, generally diagrammatic illustration of apparatus disposed in an organized system for producing the tubing embodiment illustrated for instance in FIGS. 6 and 7 of the drawings, and more particularly a tubing embodying an expanded foam type of thermo barrier.

Referring now to the drawings, and more particularly to FIGS. 1 and 2 thereof, there is shown a piece of composite tubing T comprising a sampling or control line 10 and a heating line 12 running parallel to the control line 10, and disposed in abutting contact therewith. The sampling line 10 is preferably made from a polymeric material, and the heating line 12 is preferably made of a good heat transmitting, anticorrosion metallic material, such as for instance copper. The heating line 12 is adapted to carry, for instance steam. Encompassing the heating and sampling lines may be a layer 14 of filter material to give a generally cylindrical or uninterrupted configuration to the bundle of juxtaposed lines 10 and 12.

In accordance with the invention, the preferred materials for use in the polymeric sampling line 10 are the fluorinated hydrocarbons, such as polytetrafluoroethylene known as Teflon PTFE or fluorinated ethylene propylene known as Teflon FEP. The PTFE material has a higher temperature resistance and relatively better chemical resistance and is, therefore, preferred. Other materials which are suitable are the Kel-F resins produced by Minnesota Mining & Manufacturing. Materials which may be suitable for some applications include polymers, such as the nylons, polyacetates and high density polyethylenes.

The layer 14 of filler material may be formed of fibrous material, such as for instance, jute, or other filamentary material, and may be somewhat heat insulating. The lines 10 and 12 and filler material 14 are then wrapped with a good thermo barrier 16, such as for instance a laminated Dacron-asbestos tape known as Mylar and having good heat insulating characteristics. Dacron, a trademark, is a synthetic polyester fiber produced by the condensation of terephthalic acid and ethylene glycol. Mylar, a trademark, is a polyethyleneterephthalate polyester film of tough, strong characteristics. This wrap is preferably applied in the overlapping spiral fashion illustrated in FIG. 1, and then the wrapping 16 is covered with an outer sheath or jacket 20 of flexible plastic material, to add to the corrosion resistance of the composite tubing and prevent weathering of the materials making up the composite tubing. This outer jacket may be formed of any suitable flexible plastic material, such as for instance the polyvinyl chlorides, polyethylenes, polyurethenes, neoprenes, or fluorocarbons (e.g., Teflon).

FIG. 3 illustrates a form of composite sampling tubing similar to that of FIGS. 1 and 2 except that there has been provided a plurality, and more particularly three, heating tubes or lines 12' disposed symmetrically and generally parallel about the sampling tube 10 and in intimate contact therewith, for increased and more uniform heating of the sampling tube. It will be understood that while only one sampling line has been illustrated, that the composite tubing could also include a plurality of such sampling lines.

Referring now to FIGS. 4 and 5, there is shown a composite sampling tubing comprising a sampling tube 22 and a generally parallel juxtaposed heating tube 24. In this form, a plurality of preferably good heat transmitting elongated elements, such as copper wires or rods 26, are disposed in the valleys defined between the juxtaposed tubes 22 and 24, for generally rounding out the configuration of the line bundle 22 and 24 into a generally oval-shaped, and then the heat insulating wrap material 16 or thermobarrier is wound around such configuration, and in the same general manner as aforedescribed in connection with FIGS. 1 to 3. Then, the whole package is jacketed in the outer plastic sheath material 20.

In accordance with the invention and referring now to FIG. 11, there is diagrammatically illustrated apparatus set up in an organized system for producing the tubing shown for instance in FIGS. 1 to 5 of the drawings and which constitutes the divisible subject matter of the aforementioned application Ser. No. 250,390. Such apparatus may comprise a reel 28 of the sampling tubing 10 or 22 and a reel 30 of the heating tubing 12 or 24. It will be understood, of course, that if more heating line runs are utilized, in the composite sampling tubing than one, and as for instance the three runs illustrated in FIG. 3, then more reels of the heating tubing disposed about the reel of the sampling tubing will be required.

The heating and sampling lines may be moved through a straightener 32 which may consist merely of a powered rotatable grooved cylindrical member, for moving and straightening the tubing from the reels, and then the tubing disposed in juxtaposed relation may be moved through a conventional filler applying mechanism 32 for applying the flexible filler material 14 to the tubing. This mechanism 34 may include means for chopping up fibers, for instance if the fibers are comprised of fiberglass or the like, and for mixing such fibers with a suitable adhesive material as is conventionally known in the fiber art, and then applying the fibrous materials as by blowing of laying it down in a suitable manner about the associated sampling and heating lines 10 and 12 to produce the uninterrupted surface configuration. The fiber coated tubing may then be passed through a conventional taping mechanism 36 for applying the thermo barrier 16 thereto, and at which time the asbestos-Dacron tape is wound about in overlapping relation the filler layer 14. The wrapped tubing may then be moved on the conventional roller conveyor 38 through a conventional extruding mechanism 40, including cross head 40a, where the hot plastic material is applied to form the flexible outer sheath 20 of the composite tubing. There may also be provided in conjunction with mechanism 40, a conventional vacuum unit 44, for sizing the outer sheath and maintaining a predetermined thickness thereof on the thermo barrier layer 16. From the cross head 40a of the extruder, the hot tubing may move first into a preliminary cooling tank 46 filled with, for instance, water, for setting the plastic material forming the outer sheath 20, and then a haul-off mechanism 46a of any suitable type and as for instance the well known catapillar type, may be utilized to move the tubing into a further main cooling tank 46b for cooling and curing of the tubing adequately for winding it upon reel mechanism 48 where it is ready for use.

If the composite tubing is of the type illustrated for instance in FIGS. 4 and 5, and not having the fibrous filler layer 14, then station 34 will apply the filler wires or rods 26, which wires may be mounted upon reels, and moved with or layed down in the valleys between the sampling and the heating lines to give a more uninterrupted surface to the line bundle as well as more uniform heat transfer.

Referring now to FIGS. 6 and 7, there is illustrated a composite sampling tubing wherein instead of having the thermo barrier layer formed by a wrap of asbestos and Dacron tape, the thermo barrier 50 is provided by a cured expanded foam material, such as for instance cured polyurethane foam, which is of high heat insulating character. In other respects, this composite tubing is generally similar to the first described embodiments.

The polyurethane foam could be performed, having apertures running therethrough for receiving therein in cured condition, the sampling line 10 and the heating line 12, or the polyurethane foam material may be mixed up and applied in the tubular liquid or gel form before the foam sets.

Referring to FIG. 14, there is illustrated diagrammatically, apparatus set up in an organized system, for providing the foamed thermo barrier layer 50 of FIGS. 6 and 7 which also constitutes the divisible subject of the aforementioned application Ser. No. 250,390. The sampling and heating lines 10 and 12 are moved from a pay-off station 52 through the straightener 32, to station 54 where the expanded foam thermo barrier 50 may be applied. Such station may include holding tanks 56, 56a for respectively the prepolymer and the catalyst or chain extender, and a mixing head 58 together with a control panel and metering pump 60, all conventional mechanism utilized in the production of expanded polyurethane foam. The foam is applied to the juxtaposed sampling and heating lines in head 58 after mixing and foaming of the prepolymer and catalyst, and the foam coated tubing may pass through a drying mechanism 62 for positively setting and curing the foam, on the sampling and heating lines. Thereupon, the foam coated lines are passed through the aforedescribed extruding mechanism 40 which applies the external plastic sheath 20 to the composite tubing, and then such tubing may be passed through a conventional cooling tank to adequately cool the outer sheath, for winding upon a coiler 48 for shipment or storage. This extruding mechanism does not embody a preliminary cooling tank as that identified by numeral 46 in the FIG. 11 arrangement, since the sheath material may be adequately set upon extrusion at head 40a, for coaction with haul-off 46a.

FIG. 8 illustrates a modification of the invention wherein the sampling line 10 is preferably wound in spiral form about the heating line 12b in intimate contact therewith, instead of having the sampling line running parallel or linearly. Such an arrangement will give a generally more uniform degree of heating of the sampling line. In other respects the FIG. 8 is generally similar to that aforediscussed in connection with FIGS. 1 and 2.

Referring to FIGS. 12 and 13, there is illustrated apparatus for forming the spiral wound sampling arrangement illustrated in FIG. 8, which further constitutes the divisible subject matter of aforementioned application Ser. No. 250,390, and wherein the coil 30 of heating line 12a is fed through a conventional cabling machine 66 having a reel 28 of sampling line which spirals the sampling line 10 about the heating line and then passes the material to the filler layer applying mechanism 34 and the taping machine 36 similarly as in the first described embodiment. The tubing may then be wound upon a reel 68 and then the reel 68 may be transferred to pay-off station 70 where the tubing may be fed to a conveyor 72 and then through extrusion mechanism 40 in a similar manner as aforedescribed for the first embodiment. While the mechanism or apparatus for producing the spirally wound sampling line type of composite tubing has been shown in two distinct steps, it will be understood that such apparatus could be disposed in an aligned condition for the continuous production of tubing. Furthermore and as disclosed in the aforementioned application Ser. No. 250,390, it is to be understood that when the apparatus is employed for producing the spirally wound metal sampling line construction, a coil of metal sampling line would be fed through the cabling machine 66 having a reel of metal heating line which spirals the heating line about the sampling line rather than vice versa, as in the present application.

FIGS. 9 and 10 illustrate a modified form of the spirally wound sampling line type of tubing, using the thermo barrier layer 50 aforedescribed in connection with FIGS. 6 and 7; also there has been provided a plurality of sampling lines 10 spirally wrapped around the heating line 12b.

The composite tubing of the invention enjoys greatly reduced costs of installation, as compared to the custom-made structures heretofore used, is of considerably less bulk and of a smaller cross section and lighter weight per foot, as compared to such prior arrangements, and a tubing which gives much more accurate and uniform results from samples taken thereby.

What is claimed is:

1. In an apparatus system for producing a deformable, composite tubing product for use in sampling fluids, said system comprising pay-off means for a sampling line, pay-off means for a heating line, means disposed for moving said lines in engaged heat transferring relation throughout their length, means for applying a flexible thermo-barrier layer in encompassing relation with respect to said lines, and means for applying an outer flexible polymeric sheath to said thermo-barrier layer, and means for moving the product in a direction parallel to its length through the system.

2. In an apparatus system in accordance with claim 1, including a means for applying a filter material to said lines prior to application of said thermo-barrier layer.

3. In an apparatus system in accordance with claim 1, including cooling means for cooling the product after movement thereof beyond said means for applying said polymeric sheath.

4. In an apparatus system in accordance with claim 1, including means for applying said sampling line in spiral engaged relation wtih respect to said heating line.

5. In an apparatus system in accordance with claim 1, including a straightener device for moving and straightening the lines from said pay-off means.

6. In an apparatus system in accordance with claim 2, wherein said applying means includes means for blowing the filler material into said lines.

7. In an apparatus system in accordance with claim 3, wherein said cooling means includes a first fluid cooling tank for setting the material of said outer sheath, and a second fluid coling tank for final cooling of the tubing.

8. In an apparatus system in accordance with claim 7, including a reel mechanism for storing the cooled tubing in wound relation for use.

9. In an apparatus system in accordance with claim 2, wherein said applying means includes reel mechanisms for applying metallic wire elements in the valleys between said lines.

10. In an apparatus system in accordance with claim 1, wherein the means for applying said thermo-barrier layer includes a mixing mechanism for metering and blowing polymeric foam material onto said lines.

References Cited

UNITED STATES PATENTS

| 2,583,819 | 1/1952 | Cummings | 156—392 |
| 2,770,284 | 11/1956 | Myrick | 156—392 |
| 3,032,464 | 5/1962 | Grieve | 156—382 |

BENJAMIN A. BORCHELT, Primary Examiner

U.S. Cl. X.R.

156—428, 433